UNITED STATES PATENT OFFICE.

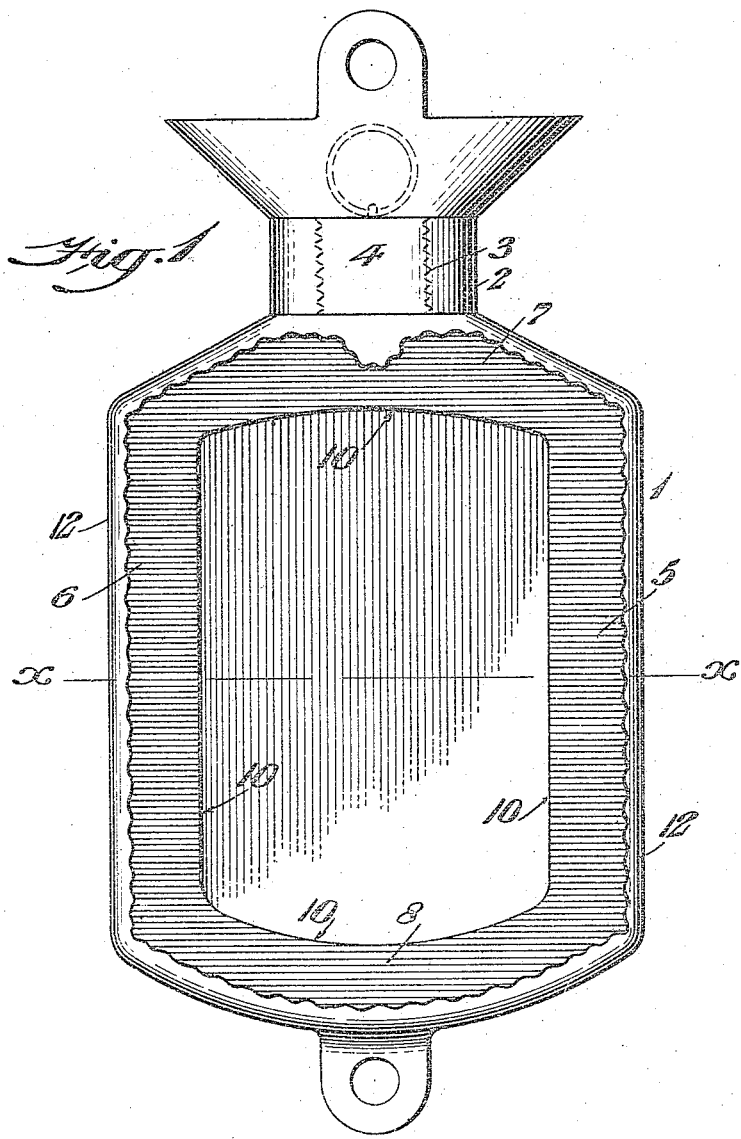

JEANNE WALTER APPLETON, OF NEW YORK, N. Y.

CONTAINER.

1,145,286.  Specification of Letters Patent.  Patented July 6, 1915.

Application filed April 9, 1915. Serial No. 20,117.

*To all whom it may concern:*

Be it known that I, JEANNE WALTER APPLETON, a citizen of the United States, residing in the city and county of New York, State of New York, have invented a new and useful Container, of which the following is a specification.

My invention relates to a new and useful container, such as a hot water bottle or ice bag, and consists in providing an open-sided receptacle or engaging means upon one side thereof which will hold a suitable compress in order that the effect of the contents of the container may be properly imparted therethrough.

It further consists of other novel features of construction, all as will be hereinafter set forth.

For the purpose of illustrating my invention, I have shown in the accompanying drawings one form thereof which is at present preferred by me, since the same will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 is a side elevation of a container, here shown as a hot water bottle, embodying my invention. Fig. 2 is a sectional view on line $x$—$x$ Fig. 1, with a compress in position.

Similar numerals of reference indicate corresponding parts in the figures.

Referring to the drawings:—1 designates a container, which is here shown as a hot water bottle, although it will be understood that the same may be of any suitable size, shape or construction, and that the invention is also adapted for ice bags. 2 designates the neck of the bottle having a suitable opening 3 therethrough for the insertion and removal of the desired material and 4 designates a suitable stopper or closure for the opening. Upon one side of the bottle, I secure at their outer edges, lips or flanges 5, 6, 7 and 8, which are here shown as formed in one piece, and which are secured adjacent the edges of the bottle. The lips or flanges serve as engaging means, extending inwardly toward each other, around the bottle 1 to form a space between the same and the side 9 of the bottle 1, serving as a receptacle, it being understood that the inner edges of the engaging means terminate at a distance from each other, forming an opening 10.

Between the engaging means and the side 9 of the bottle can be inserted a compress 11 of suitable material, the edges of which will be situated in the space with the major portion of the outer side of the compress exposed through the opening 10, and with the inner side of the compress lying in suitable contact with the side wall 9 thereof in order to be subjected to the action or effect of the contents of the bottle. The opening 10 provides that the outer surface of the compress can be placed against the body, as will be evident. It will be understood that the engaging means, that is the lips or flanges, may be made in any suitable or desired manner and connected, as desired, with the bottle or container. As here shown, I have shown the outer edges of the flanges as situated beneath and secured in position by the binding edge 12. The lips or flanges are preferably of resilient material, such as rubber, for ease of insertion of the compress and in order that a suitable engaging or gripping action will be had to hold the compress in position.

It will now be apparent that I have devised a novel and useful container, which embodies the features of advantage enumerated as desirable in the statement of the invention and the above description, and while I have, in the present instance, shown and described a preferred embodiment thereof which will give in practice satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. A device of the character stated, comprising in combination, a container having a suitable filling opening and a resilient flange extending inwardly from near the edges normally in close relation to the side of the container and having free inner edges, whereby the same may be raised up from the side to permit the insertion of the edges of a compress and released to grip and hold the compress in position.

2. A device of the character stated, comprising in combination, a container having a suitable filling opening, a resilient flange extending inwardly from near the edges normally in close relation to the side of the container and having free inner edges, whereby the same may be raised up from the side to permit the insertion of the edges of a compress and released to grip and hold the compress in position, and means for securing the outer edges of the flange to the container to form a water-tight joint around the container.

3. A double-walled container, one wall of which is surrounded and partly overlaid by a resilient inwardly extending open-centered flange, the outer edges of which are secured to the container and the inner edges free to be lifted to permit of the insertion and retention of a removable compress.

4. A device of the character stated, comprising a container having a suitable filling opening and elastic engaging strips connected to the container on one side thereof and extending longitudinally of the edges normally in close relation to the side of the container and having free inner edges adapted to be raised up from the side to permit the insertion of the edges of a compress and to grip and hold it in position.

JEANNE WALTER APPLETON.

Witnesses:
 FRANCES KIMBLE FULLER,
 MAYME GOODE.

Copies of this patent may be obtained for five cents each, by addressing the "Commissioner of Patents, Washington, D. C."